(No Model.)
C. L. BESSONETTE.
PROCESS OF BALING COTTON.
No. 603,250.                                       Patented May 3, 1898.
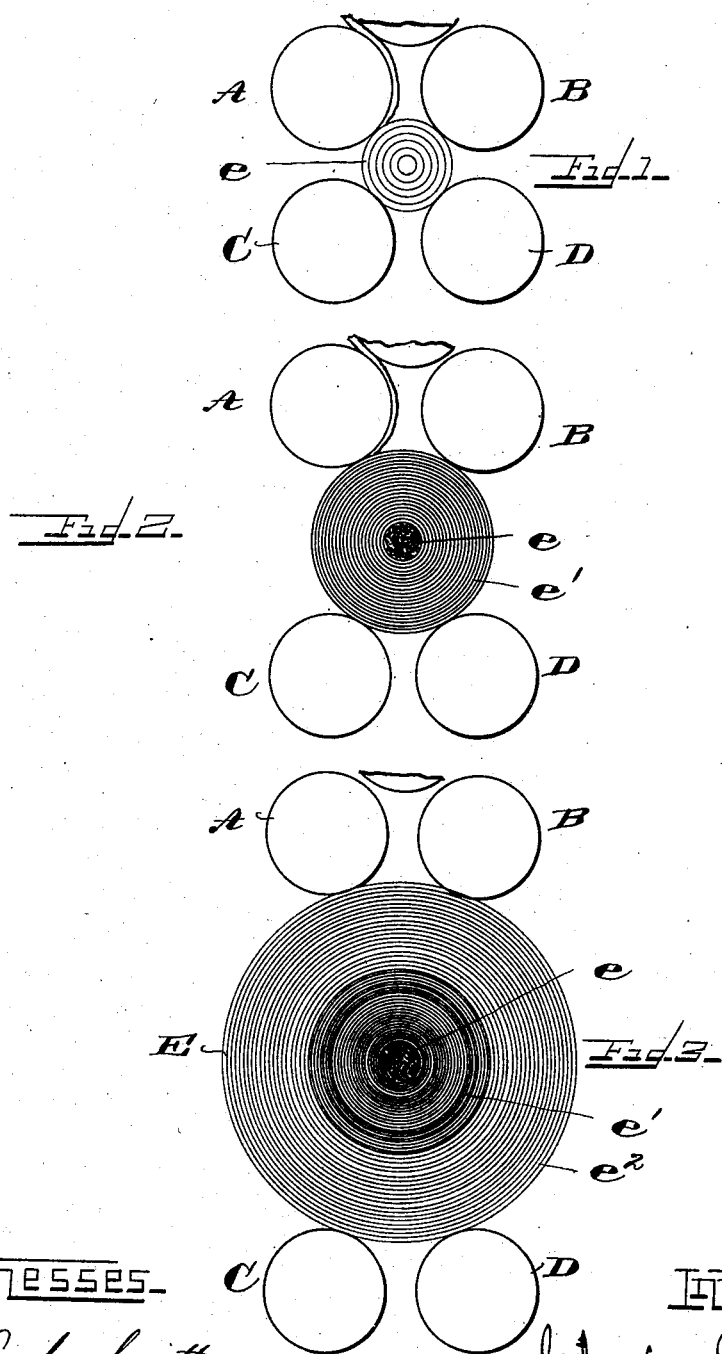

UNITED STATES PATENT OFFICE.

CHARLES L. BESSONETTE, OF WACO, TEXAS.

PROCESS OF BALING COTTON.

SPECIFICATION forming part of Letters Patent No. 603,250, dated May 3, 1898.

Application filed March 9, 1896. Serial No. 582,423. (No specimens.)

*To all whom it may concern:*

Be it known that I, CHARLES L. BESSONETTE, a citizen of the United States, residing at Waco, in the county of McLennan and State of Texas, have invented certain new and useful Improvements in Processes of Baling Cotton; and I do hereby declare the following to be a full, clear, and exact description of the invention, such as will enable others skilled in the art to which it appertains to make and use the same.

My invention consists in the novel features of construction and combination of parts hereinafter described, reference being had to the accompanying drawings, which illustrate the manner in which my improved process is carried into effect, and said invention is fully disclosed in the following description and claims.

Referring to the said drawings, which are diagrammatic views, Figure 1 represents the compressing-rollers and the cushion, core, or central portion of the bale as it is being formed. Fig. 2 represents the said rollers and bale when it has been partially finished and the cushion or core compressed. Fig. 3 represents the completed bale and the compressing-rollers.

In compressing cotton into bales by winding it lap on lap into cylindrical form it is customary to start the machine with the compressing-rollers very close together, leaving a very small space between them, and feeding the bat into the space between said rollers, where it is first formed into a loosely-wound roll or core which is very small in diameter. As soon as the core reaches a sufficient size to offer resistance to the rollers it becomes gradually compressed, and as the succeeding layers are wound on it is continuously compressed, as there is a natural tendency of the layers to creep upon each other and tighten in the roll as the bale is formed. By the time the bale is completed the original cushion-core and the laps or layers adjacent thereto have been so tightly compressed as to form almost a homogeneous mass, so that when the bale is unwound down to this part it becomes almost impossible to unwind the last part of the bat, and while in some cases it can be done slowly and with great inconvenience in some cases it cannot be drawn off in bat form.

The object of my invention is to so wind the bale that it can be drawn off down to the end of the bat without any difficulty or loss whatever.

In carrying out my invention I feed in the bat between the rollers, keeping them separated a considerable distance, and form a cushion-core of considerable diameter, preferably about nine inches. The further winding of the bat subjects the bale which is now being formed to the pressure of the compression-rollers, and a number of layers are wound on under this pressure, thereby compressing the cushion-core greatly. The cushion-core being of such size, however, possesses a great degree of elasticity, and the laps are wound on tightly and compactly, but are not so crushed as to form substantially a homogeneous body. As soon as a sufficient number of laps (which for convenience I term "binding-laps") have been wound on to thoroughly compress the cushion-core and bind it against expansion I relieve the pressure upon the compression-rollers, and the remaining laps of the bale are put on under less pressure than the binding-laps.

In Fig. 1 I have shown, diagrammatically, two stationary compressing-rollers A B and two movable compressing-rollers C D, to which pressure is applied in any usual or preferred manner. I do not, however, limit myself to a press having any particular number of rollers.

In Fig. 1 I have shown the formation of the loosely-wound cushion-core $e$ of the bale. In Fig. 2 I have shown the cushion-core compressed and the binding-laps $e'$ wound on, and in Fig. 3 I have shown the outer laps $e^2$ wound on and the bale E completed.

In unwinding a bale which has been formed by my improved process the outer laps will of course unwind freely, as they have been wound at less pressure than the binding-laps. As the binding-laps were wound upon a large cushion-core instead of a practically hard and dead core, they have not lost their natural resilience and will also unwind readily, thus releasing the cushion-core, which by its elasticity expands to substantially its original size and enables the loosely-wound laps of the core to come off freely. In this way the cotton is easily and conveniently drawn off from my bale in the best possible shape down to the very end of the bat, and a great saving to the manufacturer of time, labor, and material is effected.

What I claim, and desire to secure by Letters Patent, is—

1. The herein-described process of baling cotton, which consists in first forming a bat, then forming a loosely-wound cushion-core from the bat, then compressing the cushion-core by winding the bat about the cushion-core in true helical form, under great pressure, to form binding-laps, then winding on the bat to form a substantial number of outer laps under reduced pressure, substantially as described.

2. As a new article of manufacture, a cotton-bale consisting of a compressed cushion-core, surrounded by greatly-compressed binding-laps of true helical form, said binding-laps being surrounded by a substantial number of less tightly wound helical laps, substantially as described.

In testimony whereof I affix my signature in presence of two witnesses.

CHARLES L. BESSONETTE.

Witnesses:
L. P. WHITAKER,
J. D. KINGSBERY.